United States Patent [19]
Horton et al.

[11] Patent Number: 5,377,819
[45] Date of Patent: Jan. 3, 1995

[54] CONVEYOR APPARATUS AND METHOD

[75] Inventors: Paul L. Horton; John J. Carbone, both of Metairie, La.

[73] Assignee: The Laitram Corporation, Harahan, La.

[21] Appl. No.: 236,666

[22] Filed: May 2, 1994

Related U.S. Application Data

[63] Continuation of Ser. No. 87,479, Jul. 2, 1993, abandoned.

[51] Int. Cl.⁶ ............................................. B65G 17/06
[52] U.S. Cl. ..................................... 198/853; 198/850
[58] Field of Search ................ 198/850, 851, 852, 853

[56] References Cited

U.S. PATENT DOCUMENTS

| | | |
|---|---|---|
| 1,414,212 | 4/1922 | Samuelson . |
| 1,533,353 | 4/1925 | Smith . |
| 1,794,182 | 2/1931 | Kunz ................................... 198/853 |
| 1,817,037 | 8/1931 | Mattison . |
| 1,855,808 | 4/1932 | Schwan . |
| 2,792,928 | 5/1957 | Holz . |
| 2,909,271 | 10/1959 | Taylor . |
| 2,951,578 | 9/1960 | Hibbard . |
| 3,046,806 | 7/1962 | Collins ............................ 198/853 X |
| 3,202,266 | 8/1965 | Schmermund ...................... 198/850 |
| 3,514,941 | 6/1970 | Mueller . |
| 3,661,245 | 5/1972 | Mol et al. . |
| 3,756,382 | 9/1973 | Adey, Jr. et al. . |
| 3,857,478 | 12/1974 | Meeusen . |
| 3,870,141 | 3/1975 | LaPeyre et al. ..................... 198/853 |
| 3,895,982 | 7/1975 | Persson . |
| 3,904,028 | 9/1975 | Muller . |
| 4,080,842 | 3/1978 | LaPeyre et al. ................. 198/853 X |
| 4,084,687 | 4/1978 | Laypeyre . |
| 4,170,281 | 10/1979 | Laypeyre . |
| 4,171,045 | 10/1979 | LaPeyre ........................... 198/853 X |
| 4,213,527 | 7/1980 | LaPeyre et al. ..................... 198/853 |
| 4,351,429 | 9/1982 | Garvy . |
| 4,643,297 | 2/1987 | Krieger et al. . |
| 4,742,907 | 5/1988 | Palmaer . |
| 4,832,183 | 5/1989 | Lapeyre . |
| 4,855,174 | 8/1989 | Kawamoto . |
| 4,925,013 | 5/1990 | LaPeyre ........................... 198/853 X |
| 4,951,457 | 8/1990 | Deal . |
| 4,974,724 | 12/1990 | Lapeyre . |
| 4,989,723 | 2/1991 | Bode et al. ...................... 198/853 X |
| 5,125,504 | 6/1992 | Corlett et al. . |

FOREIGN PATENT DOCUMENTS

| | | |
|---|---|---|
| 57-42937 | 9/1983 | Japan . |
| 2164313 | 3/1986 | United Kingdom . |
| 2185725 | 7/1987 | United Kingdom . |

OTHER PUBLICATIONS

Intralox Product line flier, Copyright 1992.
KVP brochure, date unknown.
KVP brochure, Rev. Feb. 1992.

*Primary Examiner*—James R. Bidwell
*Attorney, Agent, or Firm*—Alton W. Payne

[57] ABSTRACT

The present invention provides an apparatus and method associated with conveyors for moving items where the conveyor has an endless loop belt, a wear strip for supporting the belt and a way of moving the belt. The endless loop belt comprises a succession of individual components, each component having a first end, a second end, an inner surface and an outer surface such that the first end and the second end comprise a pivot. The apparatus and method of the present invention provide that the second end of each of the components is attached to the first end of at least one of the next components of the succession of components, a longitudinal band of components is formed having a low surface friction characteristic on the inner surface of the belt, the low surface-friction, longitudinal band is engaged with the wear strip for reducing the energy consumption and drive friction and increasing the pulling strength associated with the conveyor, and an effective arrangement of components is determined for optimizing the friction characteristics of the outer surface of the belt.

31 Claims, 8 Drawing Sheets

CONVEYOR APPARATUS AND METHOD

This application is a continuation of application Ser. No. 08/087,479 filed on Jul. 02, 1993, now abandoned.

FIELD OF THE INVENTION

The present invention relates generally to a conveyor apparatus having a high friction surface and a method for constructing such a conveyor. More particularly, the present invention relates to a high surface-friction conveyor belt having low friction connecting members and an associated method.

BACKGROUND OF THE INVENTION

Conveyor belts generally, and modular conveyor belts specifically, are known. More particularly, it is known that an advantage to specific conveyor belts is having a high friction conveying surface. A modular conveyor belt having a high friction conveying surface is disclosed in U.S. Pat. No. 4,925,013 issued to James M. Lapeyre on May 15, 1990. U.S. Pat. No. 4,925,013 describes modules which make up the belt with the modules having an area on their top portion for attaching a frictional member. The frictional members include an exposed surface which exhibits increased friction characteristics and includes an appropriately shaped portion which is removably affixed to the module such that the frictional member is secured to the top of the module by suitable means such as locking receptacles, adhesives, rivets, screws, or the like.

Similarly, a conveyor belt with a connecting drive member is disclosed in U.S. Pat. No. 4,974,724 issued to James M. Lapeyre on Dec. 4, 1990. This patent defines a belt made up of modules, each module having a top surface and a bottom surface and a first and second plurality of link ends joined by a connecting structure integrally molded with the link end. Each link end of the first and second plurality of link ends defines a pivot aperture, and the pluralities of pivot apertures in turn define first and second pivot axes. In the preferred embodiment, the elongated links extend continuously from pivot axis to pivot axis with a slightly orthogonal component such that the first plurality of link, or pivot, ends are offset at least one link end width with respect to the second plurality of link ends. Also, the spacing between the thickest portions of adjacent pivot ends is somewhat greater than the width of the pivot end such that pivot ends of intermeshed modules can be pivotally connected. The modules include means for receiving a driving force which at least has a vector applied orthogonal to the pivot axis and substantially parallel to the common plane for purposes of moving the modules. A belt formed of a plurality of modules will be moved in a direction perpendicular to the parallel pivot axis. The means for receiving the driving force comprises an integrally molded connecting member located about mid-way between the two pivot axes and extending transverse to the pivot axes. The connecting member lies substantially completely above the bottom surface of the link such that very little or none of the connecting surface or member extends below the bottom surface of the module. The drive sprocket is formed such that a recess for encompassing the transverse connecting member is defined in each sprocket tooth which in turn extends between the selected pairs of the parallel and elongated lengths of a module.

A modular conveyor belt is also disclosed in U.S. Pat. No. 3,870,141 issued to James M. Lapeyre on Mar. 11, 1975. U.S. Pat. No. 3,870,141 has identical modules formed by injection molding which are pivotally connected to one another to form a conveyor belt. Each module includes a plurality of elongated elements, each element having a first pivot end and a second pivot end. The plurality of elongated elements are connected together such that apertures defined in each of the first and second pivot ends lie along a first and second pivot axis respectively, which pivot axes are parallel one to the other. The link ends of one module are intermeshed and pivotally connected by means of a pivot rod to the link ends of another module until an entire belt having a desired length and width is formed.

U.S. Pat. No. 4,171,045 issued on Oct. 16, 1979 to James M. Lapeyre clearly recognized the need for a conveying surface which would not allow objects to slip and thereby allow the belt to pass underneath the object.

Similarly, U.S. Pat. No. 4,213,527 issued to James M. Lapeyre, et al. on Jun. 22, 1980 describes a base member for forming a link conveyor belt which has ridges extending transverse to the direction of travel of the belt for preventing the conveyor belt from slipping under articles riding on the conveyor belt surface. Related patents, U.S. Pat. Nos. 4,170,281 and 4,080,842 issued on Oct. 9, 1979 and Mar. 28, 1978, respectively, both to Lapeyre also show conveying belts having members extending transverse to the conveying surface for moving articles on the conveying surface along the belt such that the belt cannot slip underneath the article.

It is, therefore, a feature of the present invention to provide a simple modular conveying belt having a high friction conveying surface such that smooth or bulking surfaced packages or other items are conveyed up or down an inclined surface with minimal slippage.

A feature of the present invention is to provide a high friction module for forming a conveyor belt which will reduce slippage between the conveyor belt and items conveyed by the belt. Another feature of the present invention is to provide a high friction assembly for forming a conveyor belt which will reduce slippage between the conveyor belt and items conveyed by the belt.

It is also a feature of the present invention to provide a high friction module or a high friction assembly for forming a conveyor belt with a high friction conveying surface, which surface is modular and has the inherent capability of being readily built to custom widths and custom lengths as well as being repaired and replaced.

Yet another feature of the present invention is to provide a high friction module or assembly which can be brick-laid to construct a conveyor belt, and which is simple and easy to clean, construct, and use.

Yet another feature of the present invention is to provide a high friction module or assembly for forming a conveyor belt with a selectable conveying surface, which belt is modular and has inherent capability for being readily built to custom widths and lengths as well as being repaired or replaced.

Yet further, an additional feature of the present invention is to provide a conveyor belt having a variable friction surface for engaging items to be conveyed by the belt, and simultaneously reducing the friction associated with the support members under the belt.

Still further, another feature of the present invention is to provide a high friction conveyor belt having a continuous, longitudinal engagement of low friction modules or assemblies for engaging the support structure or wearstrips of the conveyor belt.

Another feature is to combine a high-friction conveying surface with a substructure of high strength and stiffness.

Yet still another feature of the present invention is to provide a conveyor belt having variable friction modules or assemblies for engaging items to be conveyed on the belt, and simultaneously, reducing the friction associated with support members or wearstrips along all contact surfaces of the conveyor belt.

An additional feature is to maximize a high friction surface with a low friction subsurface to minimize the amount of energy needed to rotate or drive the conveyor belt.

Yet still another feature of the present invention is to minimize the friction between the wear strip and the low friction modules and high friction assemblies to achieve the optimum ability to move objects on the conveyor belt and minimize the wear to the wear strips and the wear to the modules and assemblies.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a conveyor apparatus is provided for moving items comprising an endless loop belt comprising a succession of individual components, the components comprising a first end, a second end, an inner surface and an outer surface, such that the first end and the second end comprise a pivot, and a wear strip for supporting the belt, such that the second end of each of the components is attached to the first end of at least one of the next components of the succession of components, a longitudinal band of components is formed having low surface-friction characteristics on the inner surface, and the low surface-friction, longitudinal band is operationally associated with the wear strip for reducing the energy consumption and drive friction while increasing the available pulling strength associated with the conveyor.

In another embodiment of the present invention, a method associated with conveyors for moving items is provided. The conveyor comprises an endless loop belt, a wear strip for supporting the belt and means for moving the belt being supported by the wear strip, the belt comprising a succession of individual components, each component having a first end, a second end, an inner surface and an outer surface, the first end and the second end comprising a pivot. The method comprises the steps of: (a) attaching the second end of each of the components to the first end of at least one of the next components of the succession of components, (b) forming a longitudinal band of components having low surface-friction characteristics on the inner surface, and (c) engaging the low surface-friction, longitudinal band with the wear strip for reducing the energy consumption and drive friction and increasing the pulling strength associated with the conveyor.

In yet another embodiment, the apparatus of the present invention is a conveyor comprising a plurality of linked components having at least one first pivot end and at least one second pivot end adapted to each component to be pivotally connected end-to-end and side-by-side by pivot rods to form an endless conveyor belt, the first pivot end and the second pivot end connected by an intermediate section, some of the components being integrally molded from a strong, stiff, low-friction slick plastic material, other of the components being integrally molded of a resilient high friction material, the friction characteristics of the resilient material being substantially greater than the slick plastic material and the low friction components being linked in a longitudinal band aligned with a supporting wearstrip so that the belt exhibits low friction in contact with the wearstrip and a higher friction on the outer side of selected components and can be efficiently driven.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
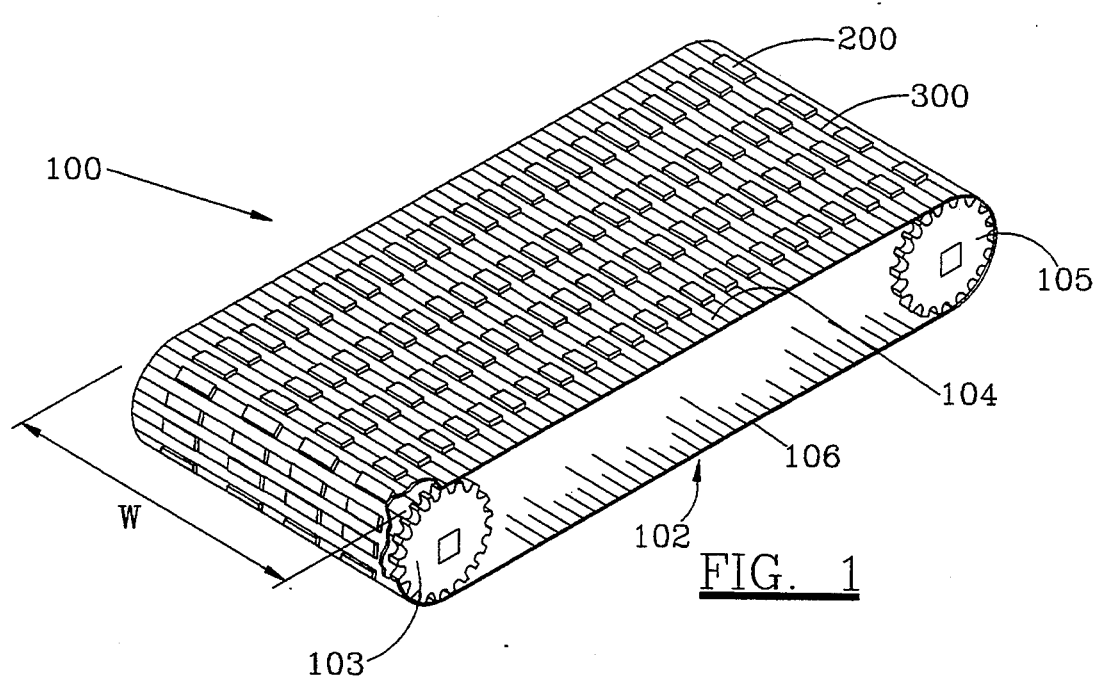
FIG. 1 is a perspective view of a conveyor belt which includes high friction and low friction modules of a specific pattern as practiced by the present invention.

FIG. 1 is a perspective view illustrating a conveyor 100 in association with the present invention. The conveyor 100 has as its principle components an endless loop belt 102, a first sprocket 103 and a second sprocket 105. The endless loop belt 102 has a top surface 104 and a bottom surface 106. Also, the endless loop belt 102 comprises an assemblage of low friction modules 300 and high friction modules 200.

As will be appreciated by those skilled in the art, the sprockets 103, 105 may be used to provide a driving force to the belt 102. Various and sundry means are available for driving the belt 102 with the sprockets 103, 105. As can be appreciated by those skilled in the art, and as taught by the cited patent references, many different ways exist for mobilizing the belt 102. The sprockets 103, 105 are merely examples known by the artisan.

Figure 2:
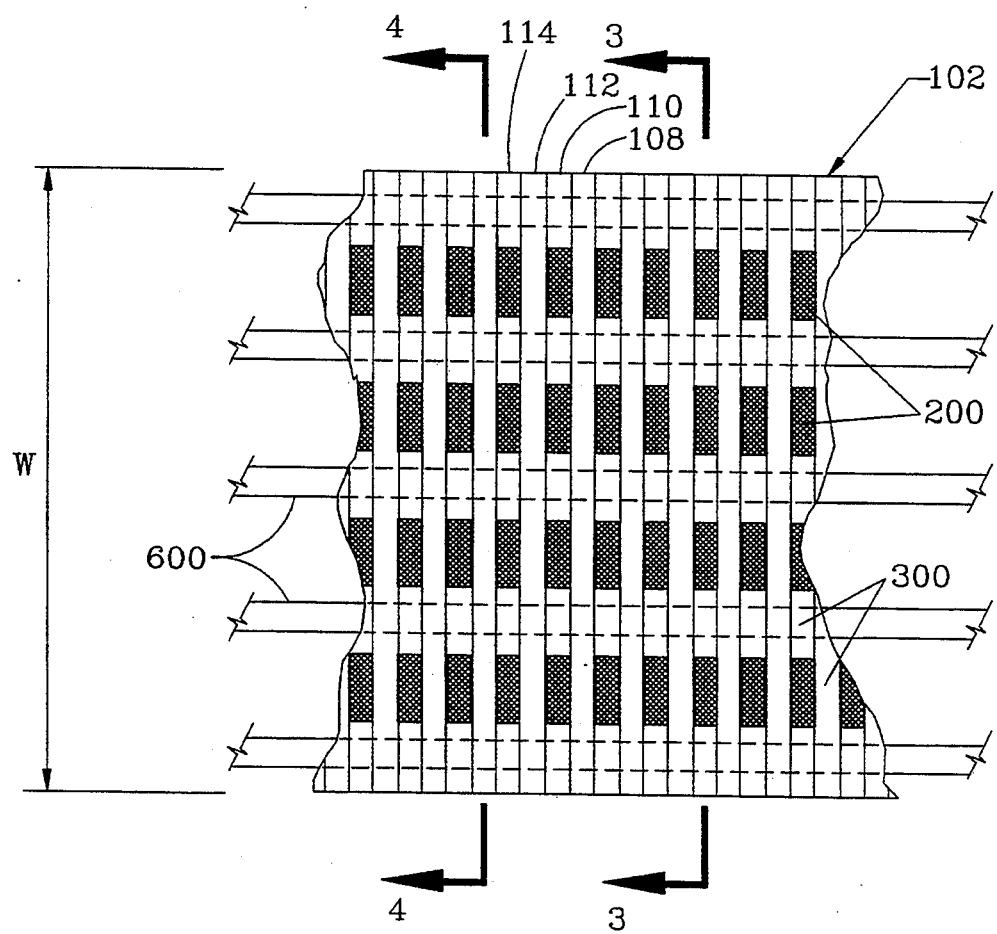
FIG. 2 is a plan, cut-away view of FIG. 1 illustrating the relationship between the high friction modules, low friction modules and wear strips for the particular embodiment of the present invention illustrated in FIG. 1.

FIG. 2 is a plan view of the top surface 104 of the endless loop belt 102 as illustrated in FIG. 1. FIG. 2 illustrates the pattern of high friction modules 200 in association with the low friction modules 300. Of primary importance is the relationship between one or more wear strips 600 and the low friction modules 300. It can be appreciated that the wear strips 600 are engaged only with the low friction modules 300. The engagement of the wear strips 600 with the low friction modules 300 provides for a more fluid, low-friction movement of the endless loop belt 102. The high-friction modules are preferably made of a thermoplastic rubber, but could be made of a number of high-friction materials. The low-friction modules are preferably made of a slick, but durable, plastic material, such as acetal, polyethylene, polypropylene, or nylon. The wearstrips are preferably made of a durable plastic or of stainless or cold-rolled carbon steel.

FIG. 2 illustrates a specific pattern relationship between the high friction modules 200 and the low friction modules 300. The belt 102 comprises a plurality of lateral rows 108, 110, 112, 114 which span the width W of the belt 102. The lateral rows 108, 112 comprise low friction modules 300. The lateral rows, for example, 110, 114 include alternating high friction modules 200 and low friction modules 300. The pattern requires that the wear strips 600 engage only low friction modules 300. This arrangement provides for low friction between the belt 102 and the wear strips 600.

Figure 3:
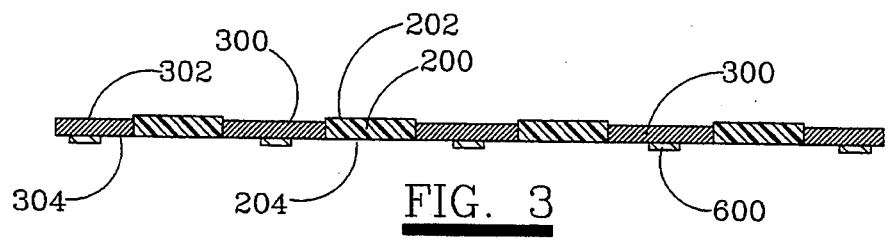
FIG. 3 is a cross-section of the embodiment of the present invention illustrated in FIG. 2 taken along the section line 3—3.

FIG. 3 is an elevation view of the belt 102 taken along the section 3—3 in FIG. 2. FIG. 3 illustrates the alternating use of the high friction modules 200 and the low friction modules 300. The low friction modules 300 are engaged with the wearstrips 600. Also, although not illustrated, it can be appreciated by one skilled in the art that the drive mechanism, as readily known in the art, can be better adapted in association with the low friction modules 300. FIG. 3 also illustrates the top surface 302 of the low friction modules 300, and the bottom surface 304 of the low friction modules 300. Similarly, the high friction modules 200 have a top surface 202 and a bottom surface 204. The wear strips 600 movably engage the bottom surface 304 of the low friction modules 300 for providing a readily slidable, low friction arrangement. The high friction modules 200 are illustrated having a top surface 202 sufficiently higher than the top surface 302 of the low friction module. It can be appreciated by one skilled in the art that the rise distinguishes the top surface 202 of the high friction module 200 from the top surface 302 of the low friction module 300.

Figure 4:
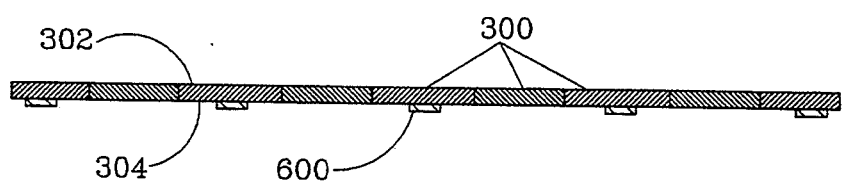
FIG. 4 is a cross section of the embodiment of the present invention illustrated in FIG. 2 taken along the section line 4—4.

FIG. 4 is an illustration of a plurality of low friction modules which make up a single lateral row across the width W of the belt 102 as illustrated in FIG. 2 and associated with the cross section 4—4. The bottom surface 304 of the low friction modules 300 are engaged with the wear strip 600.

Figure 5:
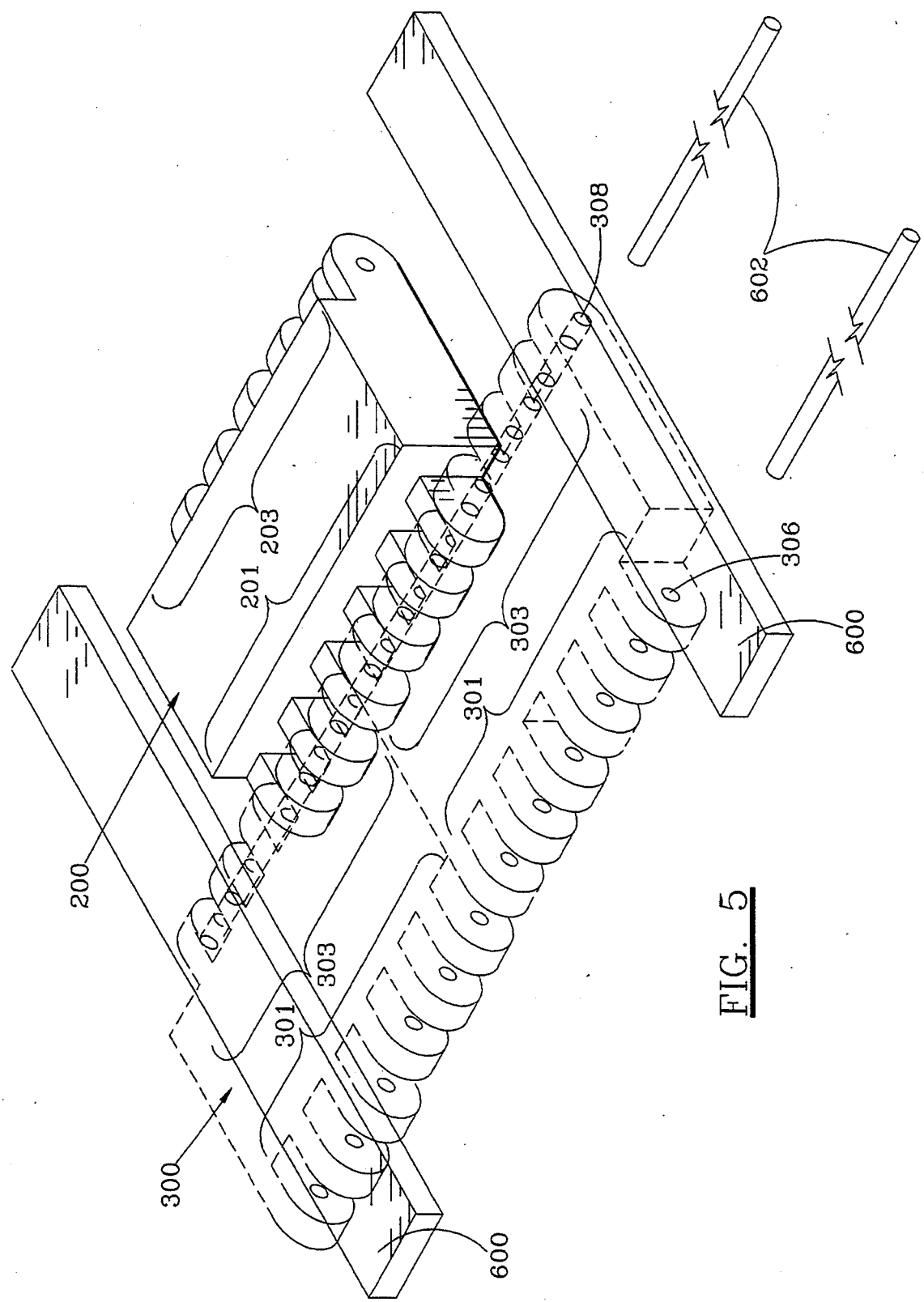
FIG. 5 illustrates a section of the conveyor belt of FIGS. 1, 2, 3 and 4.

FIG. 5 is a perspective, cut-away view of the associated positions of the high friction module 200, several low friction modules 300 and the wear strips 600. Each of the high friction modules 200 has a plurality of first pivot ends 201 and a plurality of second pivot ends 203. The plurality of first pivot ends 201 are arranged to be on the opposite end of the modules 200 from the second plurality of pivot ends 203.

Similarly, the low friction modules 300 have associated with them a plurality of first pivot ends 301 oppositely disposed from a plurality of second ends 303. The second pivot ends 303 of the low friction modules 300 are engaged for pivoting with the first pivot ends 201 of the high friction modules 200. It can be appreciated by one skilled in the art that the high friction modules 200 can be pivotally associated with the low friction modules 300 so as to configure almost any relationship or pattern for the belt 102. The first pivot ends 201 of the high friction modules 200 and the second pivot ends 303 of the low friction modules 300 are pivotally secured by the rods 602.

Figure 6:
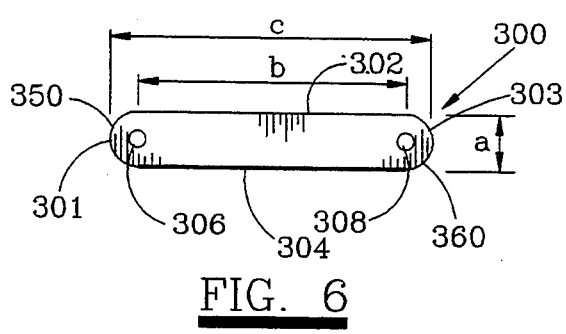
FIG. 6 is an elevation view of a low friction module as practiced by the present invention, as illustrated in FIGS. 1-5.

FIG. 6 illustrates with more particularity the low friction module 300. The low friction module 300 has a top surface 302, a bottom surface 304, a first end 301 and a second end 303. In a preferred embodiment the first end 301 and the second end 303 are curved for providing a pivotal relationship between the connected modules. FIG. 6 also illustrates an aperture 306 associated with the first end 301 and an aperture 308 associated with the second end 303 of the low friction module 300. The apertures 306, 308 accept rods 602 for providing a hinged pivotal relationship between the respective modules 200, 300.

FIG. 6 also illustrates the proportionate relationship of the dimensions of the low friction module 300. The height a of the low friction module is constant between the top surface 302 and the bottom surface 304. The distance between the first end 301 and the second end 303 is the span c. Related to the span c is the pitch b measured between the centers of the aperture 306 in the first end and the aperture 308 in the second end.

Figure 7:
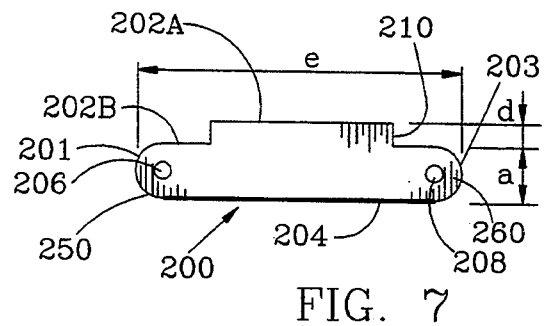
FIG. 7 is an elevation view of a high friction module as practiced by the present invention, and illustrated in FIGS. 1-5.

FIG. 7 illustrates a high friction module 200 as shown in FIG. 1. The high friction module 200 comprises a bottom surface 204, an uppermost surface 202A, a top surface 202B, a first end 201, and a second end 203. The first end 201 has therein an aperture 206. The second end 203 has an aperture therein 208. The height a of the high friction module 200 is the distance separating the bottom surface 204 and the top surface 202B. The perpendicular distance separating the top surface 202B and the uppermost surface 202A is the rise d. Thus, the total elevation associated with the high friction module 200 is the height plus the rise, a+d.

Figure 8:
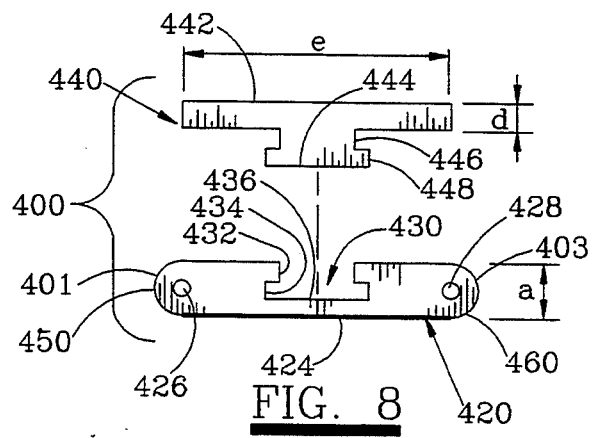
FIG. 8 is an elevation, break away view of a high friction assembly as practiced by the present invention.

FIG. 8 illustrates a high friction assembly 400 as practiced by the present invention. The high friction assembly 400 comprises a base 420 and an extension 440. The base 420 has a bottom surface 424, a top 422, and a receptacle 430. The receptacle 430 is, in the illustrated embodiment, placed intermediate between a first end 401 and a second end 403. The receptacle 430 comprises a ridge 432 which provides an overhang for a recess 434. The high-friction extension 440 comprises a top surface 442, a bottom surface 444, a ridge 448, and a recess 446. The top surface 442 may be smooth or textured or cover selected portions of the top 422 of the base 420 to provide a range of frictional characteristics. The ridge 448 is associated with the bottom 444. The recess 446 separates the ridge 448 from the top 442. The ridge 448 of the extension 440 engages with the recess 434 of the receptacle 430 to provide a removably affixed relationship between the extension 440 and the base 420. It can be appreciated by those skilled in the art that the receptacle 430 as well as the extension 440 can be readily modified and changed while still being clearly within the scope and content of the present invention. The height a associated with the base 420 describes the perpendicular distance between the top 422 and the bottom 424. The rise d associated with the extension 440 provides for the exposure of the extension 440 above the top surface 422.

Figure 9:
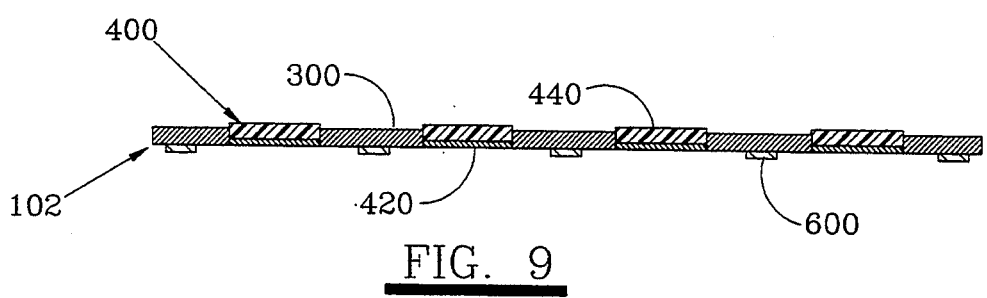
FIG. 9 is a lateral, cross sectional view of a conveyor belt as practiced by the present invention utilizing the high friction assembly and the low friction module of the present invention.

FIG. 9 is a lateral, cross-sectional view of a conveyor belt utilizing the high friction assembly 400 and the low friction module 300 of the present invention. The lateral, cross-sectional view of the belt 102 illustrates the relationship between the high friction assembly 400, the low friction module 300 and the wear strips 600. The subassemblies, the extension 440 and the base 420, are illustrated as components of the high friction assembly 400. The wear strips 600 engage only the low friction module 300. The reduced friction between the wear strips 600 and the low friction module 300 increases the weight available for placement on the belt 102. Furthermore, the reduction in friction between the wear strips 600 and the low friction module 300 provides for a much reduced energy requirement for moving the loop belt 102. Being able to place more weight and reducing the energy requirements are only examples of the enhanced characteristics of the present invention by utilizing low friction engagement of components. Additional advantages and features are obvious to those skilled in the art.

Figure 10:
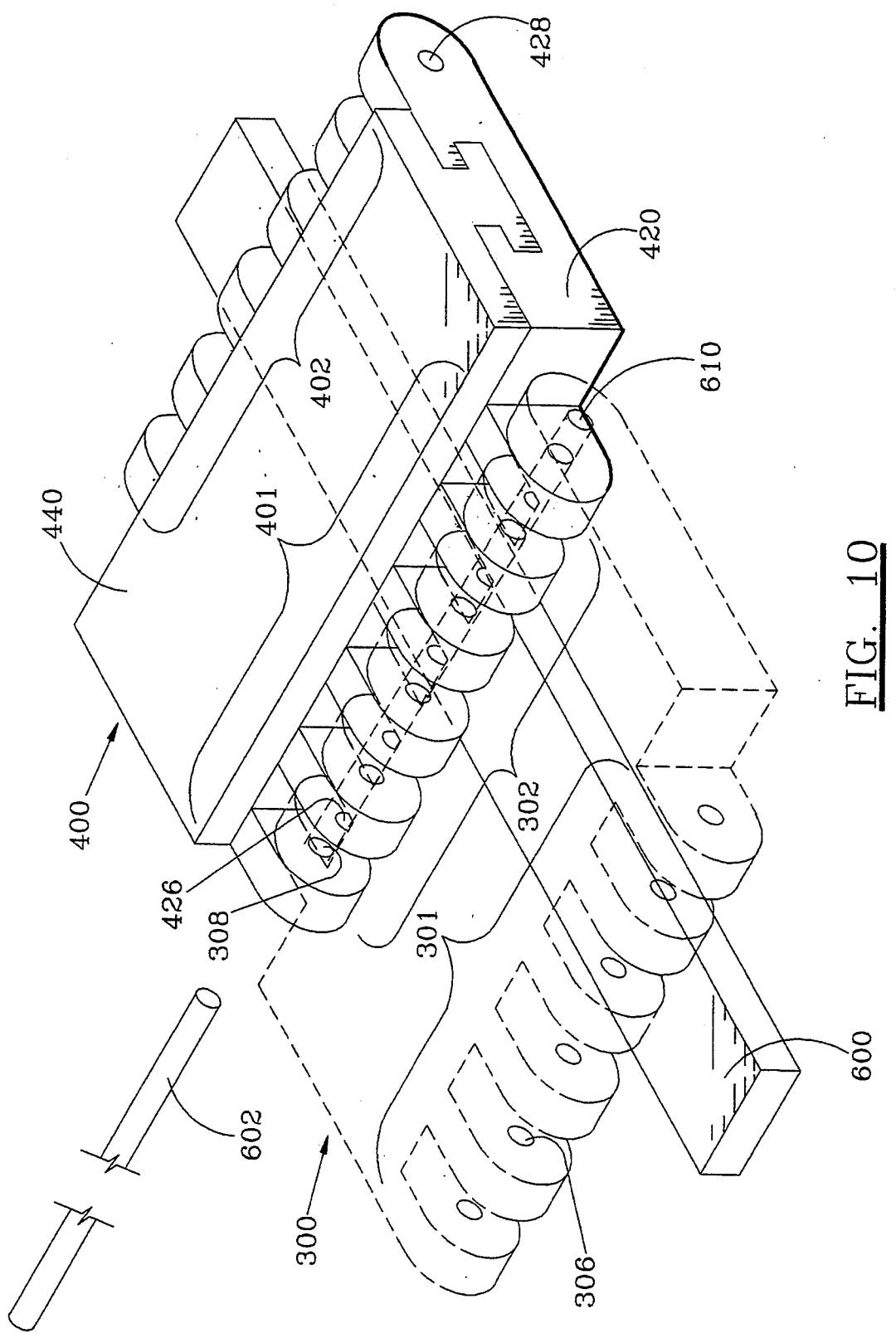
FIG. 10 is a perspective, sectional view illustrating a conveyor belt of the present invention which utilizes the low friction module and the high friction assembly as taught by the present invention.

FIG. 10 is a perspective sectional view of a conveyor belt as practiced by the present invention utilizing the high friction assembly and the low friction module as taught by the present invention. The high friction assembly 400 is pivotally associated with the low friction module 300 using the first pivot ends 401 and the second pivot ends 302, respectively. The pivot ends 401, 302 alternately intermesh with each other to form a hinge. The apertures 308 of the low friction module 300 and the apertures 426 of the high friction assembly 400 are aligned so as to form a channel 610. The rod 602 engages the channel 610 for providing a pivot about which the low friction module 300 and the high friction module 400 articulate. It is readily appreciated by those skilled in the art that alternate and different ways of pivoting the modules are readily available. Also, it is readily apparent to those skilled in the art that various techniques, apparatus and articles can be utilized to form the extension 440 of the high friction assembly 400. What is important is that the wear strips 600 engage surfaces which provide low friction characteristics, such as the inner surfaces of the low friction module 300 and the base 420 of the high friction assembly 400.

Additional high friction assemblies 400, low friction modules 300 or high friction modules 200 can be used interchangeably so long as the relationship between the wear strips 600 and the engaged modules provide for the low friction contact. Additional modules are attached to the low friction module 300 using the apertures 306 of the first pivot ends 301. Similarly, additional low friction modules 300 or high friction assemblies 400 can be attached to the apertures 428 of the high friction module 400. Further, it can be appreciated that the modules can be staggered laterally, staggered randomly, or staggered to achieve a specific pattern for which items placed on the belt 102 would achieve a more secured movement.

Figure 11:
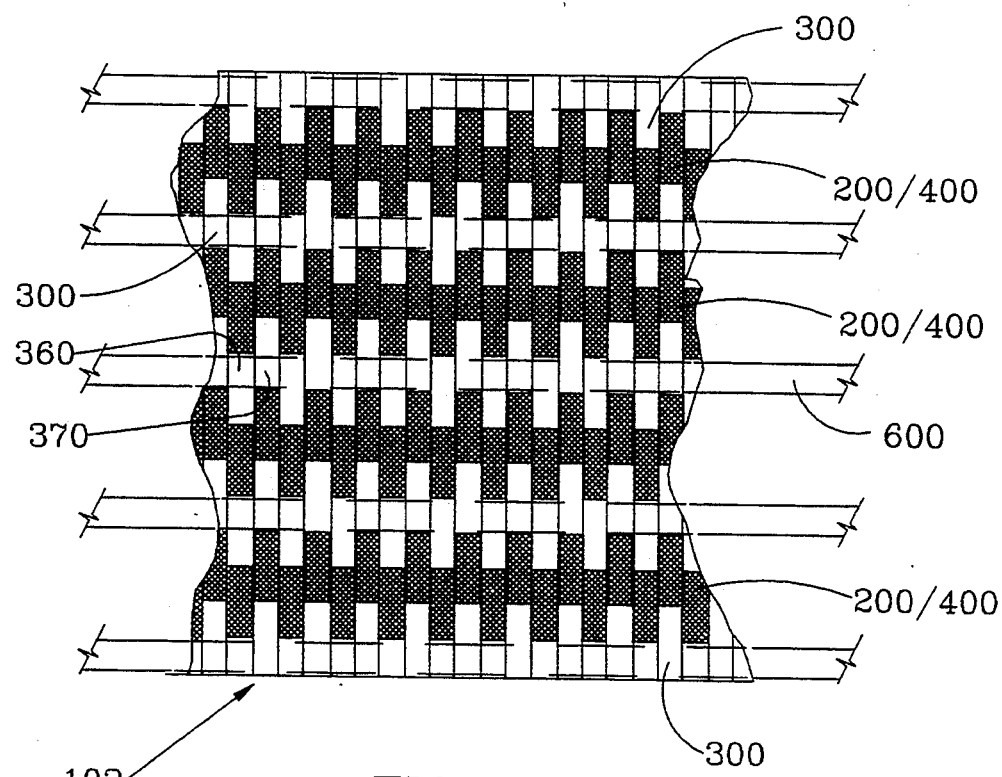
FIG. 11 is a partial plan view of a high friction conveyor belt as practiced by the present invention illustrating multiple lateral strips having alternating high friction modules and low friction modules.

FIG. 11 is a partial plan view of a high friction conveyor belt 102 practicing the present invention and illustrating multiple lateral strips having alternating high friction modules 200 and low friction modules 300 or, alternately, having alternating high friction assemblies 400 and low friction modules 300. The low friction modules 300 are staggered so that a first side portion 360 of a laterally abutting low friction module 300 engages the wear strips 600. Similarly, the abutting low friction module 300 has a second side portion 370 which engages the wear strips 600.

Figure 12:
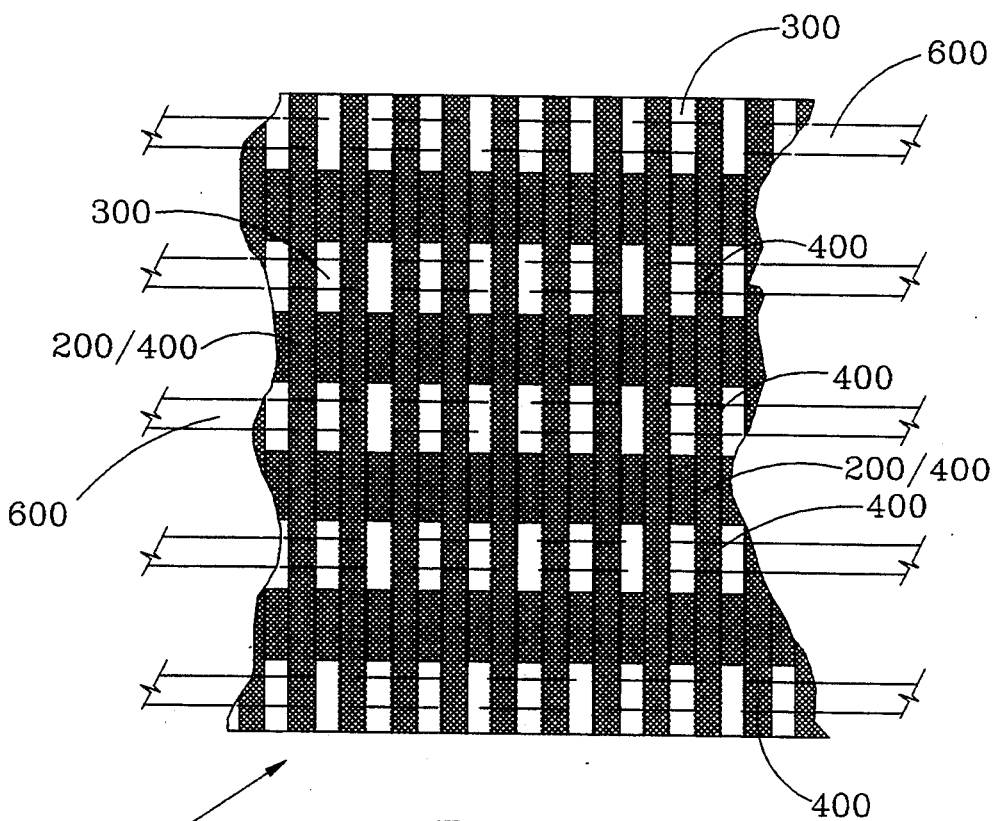
FIG. 12 is a partial plan view of a high friction conveyor belt as practiced by the present invention illustrating multiple lateral strips of alternating high friction modules and low friction modules.

FIG. 11 also illustrates the interchangeable use of the high friction module 200 and the high friction assembly 400. The high friction modules 200 and the high friction assemblies 400 can be interchangeably staggered such that either the abutting, staggered modules 200 or assemblies 400 can be used. Thus, a pattern as illustrated in FIG. 12 whereby the lateral rows form staggered high friction modules 200 or high friction assemblies 400 with alternatingly staggered low friction modules 300. The use of the high friction assembly 400 can provide that additional low friction modules can be employed by simply removing the extension 440 from the high friction assembly 400 (see FIG. 9). In such a manner, the pattern of high friction surfaces on the belt 102 can be readily altered. This great advantage can be used in designing a specific conveyor to meet a particular need depending upon the items placed on the belt, the weight of the items on the belt, the physical dimensions of the items on the belt, and the amount of friction required to maintain the item in relation to the belt speed.

FIG. 12 is a partial plan view of a high friction conveyor belt 102 as practiced by the present invention illustrating multiple lateral strips of alternating high friction modules 200 or high friction assemblies 400 with low friction modules 300. The present invention provides that the wear strips 600 engages the belt 102 at low friction points, e.g., the wear strips 600 engages the inner surface of either a low friction module 300 or a high friction assembly 400. Thus, the lateral rows illustrated in FIG. 12 which illustrate a continuous longitudinal surface of the belt 102 being of high friction characteristics requires that the locations where the wearstrips 600 engage the belt 102 elements, such elements are high friction assemblies 400, as opposed to high friction modules 200. Alternatively, raised high-friction modules 500, such as those shown in FIG. 14, could be used along the lateral rows in position to avoid high frictional contact with the wear strip 600. The intermediate belt 102 elements can be either high friction modules 200 or high friction assemblies 400. In fact, in the case of high-friction assemblies in which the bottom surface is of a low-friction material, the belt can be constructed entirely of high-friction assemblies, providing maximum resistance to product slippage and minimal frictional resistance to driving. The need to change the pattern, the need to change the friction characteristics by changing the material used in manufacturing the extension 440 of the high friction assemblies 400, the size of the items placed on the belt 102 and related operating characteristics can be readily maximized based upon the surface 104 of the belt 102.

Figure 13:
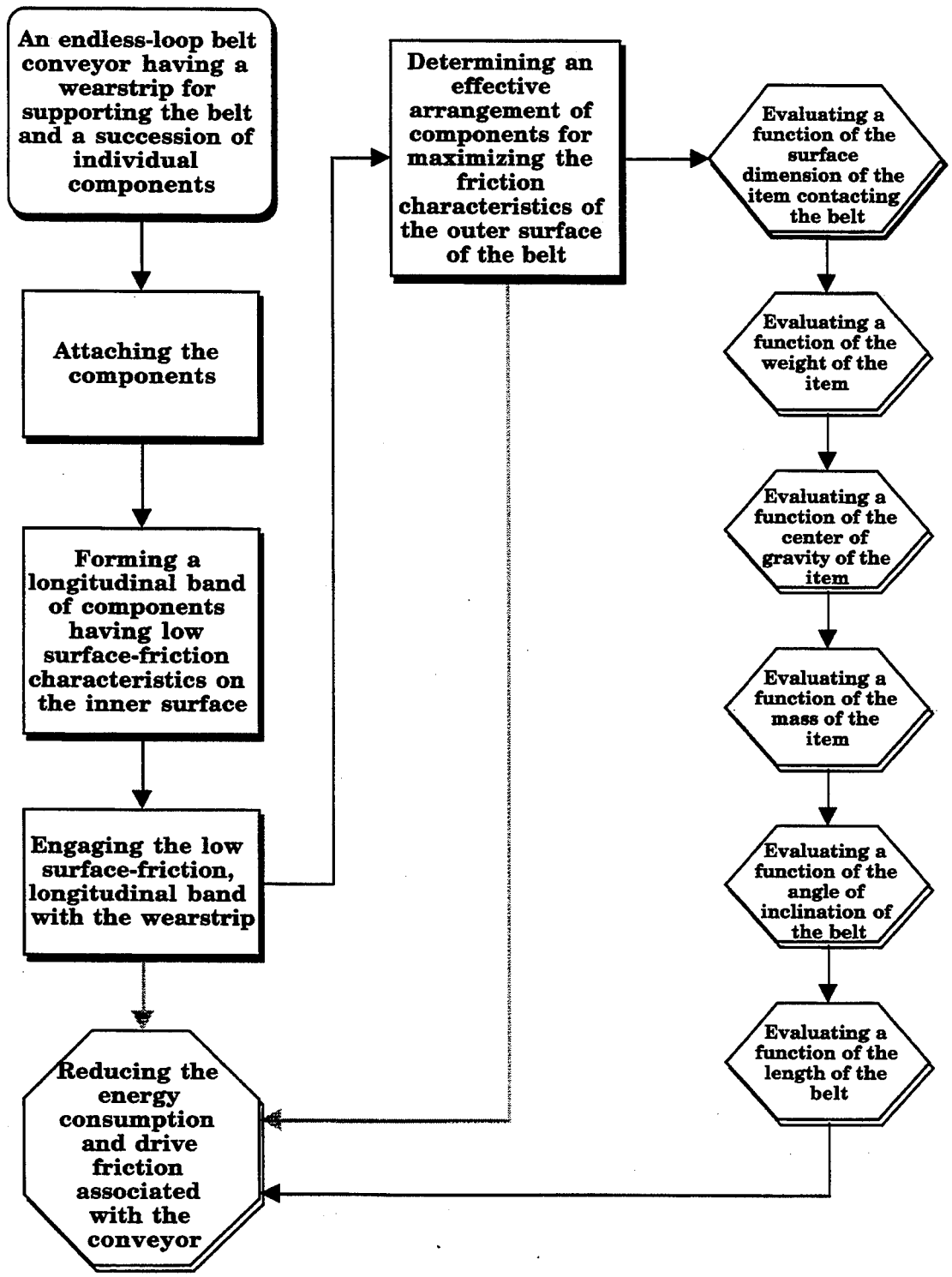
FIG. 13 is a flow diagram illustrating one embodiment of the method of the present invention.

FIG. 13 is a flow diagram illustrating an embodiment of the method of the present invention. The method of the present invention is for use with conveyors for moving items comprising an endless loop belt, a wear strip for supporting the belt and means for moving belt supported by the wear strip. The belt will comprise a succession of individual components such that each component has a first end, a second end, an inner surface and an outer surface. The first end and the second end comprise a pivot. The method comprises the steps of (a) attaching the second end of each of the components to the first end of at least one of the next components of the succession of components, (b) forming a longitudinal band of components having low surface-friction characteristics on the inner surface and (c) engaging the low surface-friction, longitudinal band with the wear strip for reducing the energy consumption and drive friction of the conveyor. Further, the method of the present invention comprises the additional step of determining an effective arrangement of components for optimizing the friction characteristics of the outer surface of the belt. The step of determining an effective arrangement of components for optimizing the friction characteristics of the outer surface of the belt comprises evaluating a function of the surface dimension of the item contacting the belt, the weight of the item, the center of gravity of the item, the mass of the item, the angle of inclination of the belt and the length of the belt.

Figure 14:
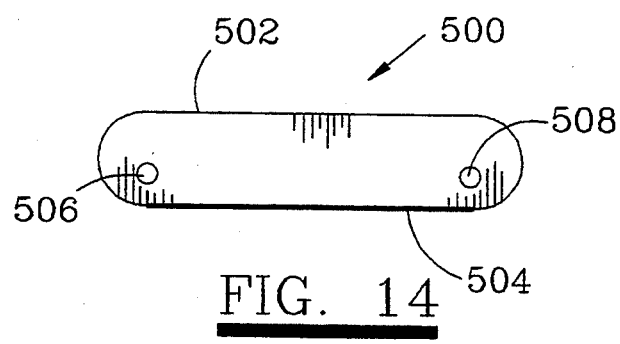
FIG. 14 is an elevation view of another embodiment of a high-friction module as practiced by the invention.
Figure 15:
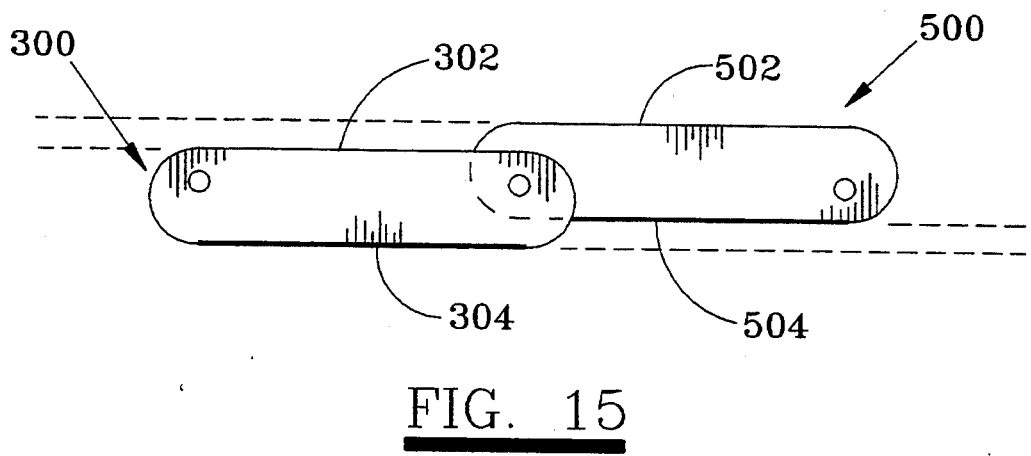
FIG. 15 is an elevation view of a high-friction module of FIG. 14 linked with a low-friction of FIG. 6.

FIG. 14 shows another embodiment of a high-friction module 500 in which the pivot rod apertures 506, 508 are closer to the bottom surface 504 than for a low-friction module 300. When such modules are interconnected, as shown in FIG. 15, the top surface 502 of the high friction module 500 extends above the top surface 302 of the low-friction module 300. Furthermore, the bottom surface 304 of the low-friction module 300 extends below the bottom surface 504 of the high-friction module 500. In this way, the salient high-friction top surfaces 502 frictionally support the product, while the salient low-friction bottom surfaces 302 engage the wear strip for minimum drag.

Figure 16:
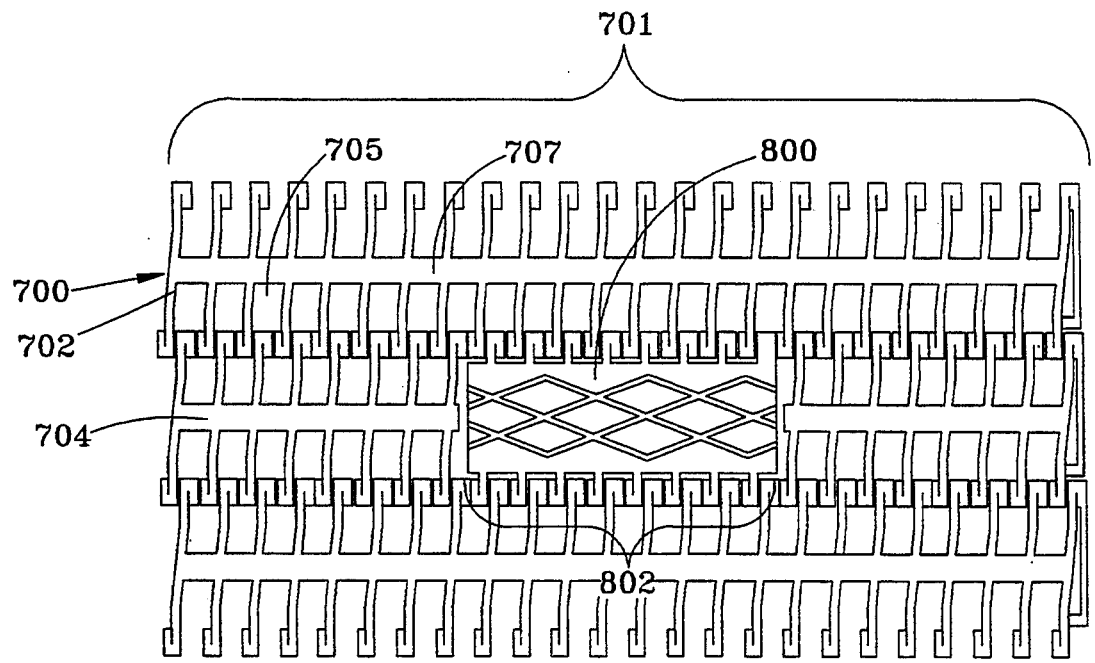
FIG. 16 is a plan view illustrating another embodiment of the present invention having a diamond-shaped module surface.
Figure 17:
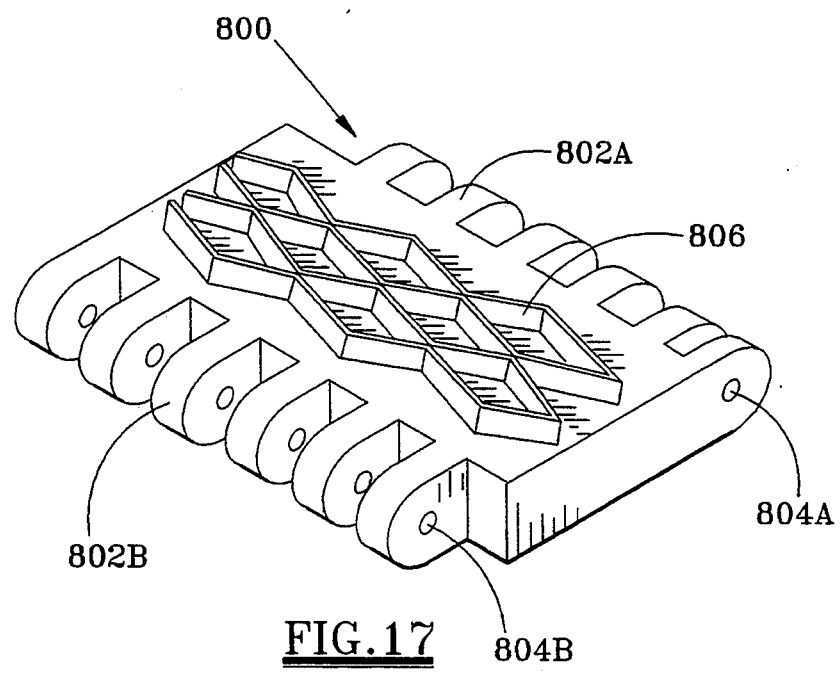
FIG. 17 is a perspective view illustrating the diamond-shaped module of the present invention as illustrated in FIG. 16.

FIG. 16 is a perspective view illustrating another embodiment of the present invention. FIG. 16 illustrates a plurality of low-friction modules 700. The low-friction module 700 is illustrated having various lengths. The low-friction module 702 is long, and the low-friction module 704 is short. The low-friction modules 700, 702, 704 illustrated in FIG. 16 are similar to the series 900 flush grid conveyor structures sold by Intralox, Inc. U.S.A., 201 Laitram Lane, Harahan, La. 70123 and described in U.S. Pat. No. 4,974,724, which is incorporated herein by reference. A belt constructed of such modules 700 is driven by toothed sprocket structure interfitting in recesses 705 and driving against the walls of a transverse bar 707, which forms a transverse driving tooth along the belt. Also illustrated in FIG. 16 is a unique high-friction module 800. The high-friction module 800 is illustrated in a perspective view in FIG. 17. The high-friction module 800 has a first pivot end 802A and a second 802B. Each pivot end has a longitudinal channel 804A, 804B, respectively. The surface of the high-friction module 800 which engages the material to be conveyed has protrusions 806 extending upward therefrom. In a preferred embodiment, the protrusions 806 have a diamond configuration. The high-friction module 800 is similar to the Intralox series 900 flat-top module with protrusions added. It can be appreciated that the entire high-friction module 800 can be made of high-friction-type material as previously discussed herein. The high friction modules 800 can be interspersed with the low-friction modules 700 (see FIG. 16) in almost any pattern. For example, the diamond high-friction modules 800 can be interspersed as illustrated in FIG. 2, FIG. 11 or FIG. 12. Alternate configurations and embodiments using the high-friction module 800 and other various and sundry low-friction modules or assemblies is readily appreciated by those skilled in the art in practicing the present invention.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method associated with conveyors for moving items, the conveyor comprising an endless loop belt, a wear strip for supporting the belt and means for moving the belt being supported by the wear strip, the belt comprising a succession of individual components, each component having a first end, a second end, an inner surface and an outer surface, the first end and the second end comprising a pivot, a first set of the components having high surface-friction characteristics and a second set of the components having low surface-friction characteristics, the method comprising the steps of:
    (a) attaching the second end of each of the components to the first end of at least one of the next components of the succession of components,
    (b) forming a longitudinal band of components selected from the second set of components having low surface-friction characteristics, and
    (c) engaging the low surface-friction, longitudinal band with the wear strip for reducing the energy consumption and drive friction associated with the conveyor.

2. A method for reducing energy consumption and drive friction associated with conveyors as defined in claim 1, the method further comprising the step of determining an effective arrangement of components selected from the first and second sets for optimizing the friction characteristics of the outer surface of the belt.

3. A method for reducing energy consumption and drive friction associated with conveyors as defined in claim 2, wherein the step of determining an effective arrangement of components selected from the first and second sets for optimizing the friction characteristics of the outer surface of the belt comprises evaluating a function of the surface dimension of the item contacting the belt.

4. A method for reducing energy consumption and drive friction associated with conveyors as defined in claim 2, wherein the step of determining an effective arrangement of components selected from the first and second sets for optimizing the friction characteristics of the outer surface of the belt comprises evaluating a function of the weight of the item.

5. A method for reducing energy consumption and drive friction associated with conveyors as defined in claim 2, wherein the step of determining an effective arrangement of components selected from the first and second sets for optimizing the friction characteristics of the outer surface of the belt comprises evaluating a function of the center of gravity of the item.

6. A method for reducing energy consumption and drive friction associated with conveyors as defined in claim 2, wherein the step of determining an effective arrangement of components selected from the first and second sets for optimizing the friction characteristics of the outer surface of the belt comprises evaluating a function of the mass of the item.

7. A method for reducing energy consumption and drive friction associated with conveyors as defined in claim 2, wherein the step of determining an effective arrangement of components selected from the first and second sets for optimizing the friction characteristics of the outer surface of the belt comprises evaluating a function of the angle of inclination of the belt.

8. A method for reducing energy consumption and drive friction associated with conveyors as defined in claim 2, wherein the step of determining an effective arrangement of components selected from the first and second sets for optimizing the friction characteristics of the outer surface of the belt comprises evaluating a function of the length of the belt.

9. A conveyor apparatus for moving items comprising:
(a) an endless loop belt comprising a succession of individual components selected from a first set of components having high-friction characteristics and a second set of components having low friction-characteristics, the individual components comprising
(1) a first end,
(2) a second end,
(3) an inner surface, and
(4) an outer surface, such that the first end and the second end comprise a pivot, the second end of each of the components being attached to the first end of at least one of the next components of the succession of components to form the endless conveyor belt, the outer surface of the first set of components protruding beyond the outer surface of the second set of components to form a high-friction conveying surface, and
(b) a wear strip for supporting the belt, the first and second sets being further attached such that a longitudinal band of components is formed having low surface-friction characteristics on the inner surface, and the low surface-friction, longitudinal band is operationally associated with the wear strip for reducing the energy consumption and drive friction while increasing the pulling strength associated with the conveyor.

10. The conveyor apparatus for moving items as defined in claim 9 wherein the first set of components having high-friction characteristics comprises resilient modules made of flexible material.

11. The conveyor apparatus for moving items as defined in claim 10 wherein the flexible material is selected from the group consisting of rubber, plastic, and leather.

12. The conveyor apparatus for moving items as defined in claim 9 wherein the pivot comprises a first plurality of the first ends of a component which are laterally offset from a second plurality of the second ends such that each end of the first plurality are in register with the spaces between the ends of the second plurality and the ends of the second plurality are in register with the spaces between the ends of the first plurality.

13. The conveyor apparatus for moving items as defined in claim 9 further comprising means for moving the belt being supported by the wear strip along a selected direction of travel.

14. The conveyor apparatus for moving items as defined in claim 13 wherein the means for moving the belt is a transverse drive bar extending from a bottom portion of the belt components, the transverse drive bar and the ends of the components forming a recess therebetween for engaging a cooperating tooth in a drive sprocket.

15. The conveyor apparatus for moving items as defined in claim 9, further comprising a plurality of pivot rods through the first and second ends of adjacent components for pivotally joining the components end-to-end and side-to-side to form the endless loop belt comprising a plurality of transverse rows of belt components, the first and second sets of components being joined in a pattern so that no two consecutive rows both contain components selected from the first set of components having high-friction characteristics.

16. The conveyor apparatus for moving items as defined in claim 9 further comprising at least one pivot rod for pivotally joining the components to form the endless loop belt.

17. The conveyor apparatus for moving items as defined in claim 9 wherein the components selected from the second set of components having low-friction characteristics further comprise:
(a) a low-friction base separating said first end from said second end;
(b) at least one high-friction protrusion extending from said outer surface; and
(c) at least one indentation receding into said inner surface.

18. The conveyor apparatus for moving items as defined in claim 17 wherein the high-friction protrusion comprises at least one diamond-shaped pattern for engaging objects to be conveyed.

19. The conveyor apparatus for moving items as defined in claim 17 wherein the indentations comprise at least one recess for receiving a means for driving said endless loop belt.

20. The conveyor apparatus for moving items as defined in claim 9 wherein the second set of the components having low-friction characteristics comprise durable modules made of a slick material.

21. The conveyor apparatus for moving items as defined in claim 9 wherein the endless loop belt comprises a pattern of attached components selected from the first and second sets of components such that no two high-friction components are engaged with each other.

22. The conveyor apparatus for moving items as defined in claim 9 further comprising said endless loop belt being inclined.

23. The conveyor apparatus for moving items as defined in claim 22 wherein the inclined endless loop belt comprises a quantity of components selected from the first set of components having high-friction characteristics, the quantity being directly proportional to the slope of the incline.

24. The conveyor apparatus for moving items as defined in claim 22 wherein the inclined endless loop belt comprises a quantity of components selected from the first set of components having high-friction characteristics, the quantity being directly proportional to the stretch of the incline.

25. The conveyor apparatus for moving items as defined in claim 9 wherein the inner surface of the second set of components having low-friction characteristics extends inwardly beyond the inner surface of first set of components having high-friction characteristics.

26. The conveyor apparatus for moving items as defined in claim 9 wherein the outer surface of the first set of components having high-friction characteristics comprises high surface-friction material which material comprises a raised diamond-like surface.

27. The conveyor apparatus for moving items as defined in claim 9 wherein the outer surface of the first set of components having high-friction characteristics comprises high surface-friction material which material comprises a raised geometric-design thereupon.

28. A pivotally linked conveyor system comprising:
 (a) a first plurality of components having high surface-friction characteristics;
 (b) a second plurality of components having low surface-friction characteristics;
 (c) a plurality of pivot rods;
   each of the first and the second plurality of components having at least one first and at least one second pivot ends, each plurality having aligned apertures therethrough, the components being pivotally connected end-to-end and side-by-side with other of the first and the second plurality of components by means of the pivot rods through the aligned apertures of the pivot ends of adjacent components to form an endless conveyor belt having an outer conveying surface and an inner drive surface;
 (d) drive means for drivingly engaging the inner drive surface;
   the first pivot ends of the components located a selected pitch dimension from said second pivot ends and further joined and maintained parallel to said second pivot ends by an intermediate section;
   each of the second plurality of components having low surface-friction characteristics being integrally molded from a durable plastic material;
   each of the first plurality of components having high surface-friction characteristics being integrally molded from a resilient material, the intermediate section of the first plurality of components protruding beyond the intermediate section of the second plurality of components at the outer conveying surface to form salient high-friction protrusions;
 (e) a wearstrip contacting the inner drive surface of the endless belt;
   the components being pivotally connected so as to form a longitudinal band of the second plurality of components having low surface-friction characteristics at least as wide as the wearstrip and aligned with the wearstrip so that the wearstrip contacts the endless belt along the longitudinal band of components having low surface-friction characteristics, thereby reducing the drive friction and energy consumption of the conveyor system.

29. The conveyor system as defined in claim 28 wherein the first plurality of components having high-friction characteristics further comprises a flat outer surface.

30. The conveyor system as defined in claim 29 wherein the first plurality of components having high-friction characteristics comprises a raised diamond-shaped design protruding from the flat outer surface.

31. The conveyor system as defined in claim 28 wherein the components are pivotally interconnected into a pattern wherein no two components selected from the first plurality of components are adjacent each other.

* * * * *